(12) United States Patent
Agarwal et al.

(10) Patent No.: US 11,468,034 B2
(45) Date of Patent: Oct. 11, 2022

(54) PROCESSING DELETE REQUESTS BASED ON CHANGE FEED OF UPDATES

(71) Applicant: Microsoft Technology Licensing, LLC, Redmond, WA (US)

(72) Inventors: Kapil Agarwal, Seattle, WA (US); Vaibhav Sharma, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 16/740,258

(22) Filed: Jan. 10, 2020

(65) Prior Publication Data

US 2021/0216524 A1 Jul. 15, 2021

(51) Int. Cl.
*G06F 16/23* (2019.01)
*G06F 11/14* (2006.01)

(52) U.S. Cl.
CPC ...... *G06F 16/2358* (2019.01); *G06F 11/1469* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 6,256,634 B1* | 7/2001 | Moshaiov | G06F 16/2308 |
| 6,487,560 B1 | 11/2002 | Larue et al. | |
| 7,953,749 B2 | 5/2011 | Sinha et al. | |
| 9,052,942 B1* | 6/2015 | Barber | G06F 3/0604 |
| 11,144,513 B1* | 10/2021 | Padisetty | G06F 16/122 |
| 2004/0177100 A1* | 9/2004 | Bjorner | G06F 12/0253 |
| 2013/0268740 A1* | 10/2013 | Holt | G06F 21/6272 |
| | | | 711/163 |
| 2019/0057101 A1* | 2/2019 | Esserlieu | G06F 3/0604 |
| 2020/0226035 A1* | 7/2020 | Li | G06F 16/2365 |

OTHER PUBLICATIONS

"Change Events", Retrieved from: https://web.archive.org/web/20191013200356/https://docs.mongodb.com/manual/reference/change-events/, Oct. 13, 2019, 16 Pages.

(Continued)

*Primary Examiner* — Eddy Cheung

(57) ABSTRACT

The disclosure herein describes processing deletion requests using sequencing numbers with change feed updates. When a deletion occurs on the source data store, a deletion notification is created in a change feed on the source server. The deletion notification includes a set of deletion record IDs identifying a set of records to be deleted, a tombstone sequence number (TSN) identifying a sequence of the deletion notification within a set of deletion notifications and/or a deletion sequence number (DSN). The DSN is incremented by one each time a new deletion notification is created. A deletion notification can represent deletion of a single record or a set of records. Each deletion notification is assigned a time-to-live (TTL) value. The deletion notification is deleted at expiration of the TTL. The TSN and the DSN entries are used to determine whether any deletion updates have been missed to prevent silent failures.

20 Claims, 10 Drawing Sheets

(56) References Cited

OTHER PUBLICATIONS

Chauhan, Shailendra, "SQL Server Insert, Retrieve, Update, Delete Operations using Stored Procedures", Retrieved from: https://www.dotnettricks.com/learn/sqlserver/sql-server-select-insert-update-delete-operations-using-stored-procedures, Apr. 21, 2011, 15 Pages.
Doddameti, et al., "Object Storage Change-Events", Application as Filed in U.S. Appl. No. 16/507,208, filed Jul. 10, 2019, 34 Pages.
Gentz, et al., "Change feed in Azure Cosmos DB—overview", Retrieved from: https://docs.microsoft.com/en-us/azure/cosmos-db/change-feed, Jul. 23, 2019, 9 Pages.
Guyer, et al., "About Change Data Capture (SQL Server)", Retrieved from: https://docs.microsoft.com/en-us/sql/relational-databases/track-changes/about-change-data-capture-sql-server?view=sql-server-ver15, Jan. 2, 2019, 11 Pages.
Paramasivam Balakrishnan, et al., "Point in Time Blob Restore", Application as Filed in U.S. Appl. No. 62/893,663, filed Aug. 29, 2019, 24 Pages.
Raja, Ganesh, "How to work with native CDC support in AWS DMS", Retrieved from: https://aws.amazon.com/blogs/database/aws-dms-now-supports-native-cdc-support/, Jun. 28, 2018, 11 Pages.
Van De Weil, Mark, "Four Methods of Change Data Capture", Retrieved from: https://web.archive.org/web/20190918034747/https://www.hvr-software.com/blog/change-data-capture/, Sep. 18, 2019, 8 Pages.
"International Search Report and Written Opinion Issued in PCT Application No. PCT/US20/061894", dated Mar. 26, 2021, 16 Pages.

\* cited by examiner

PROCESSING DELETE REQUESTS BASED ON CHANGE FEED OF UPDATES

BACKGROUND

Some database systems list changes to the data in the database in order of their modification time. The list or feed of changes includes writes and other modifications to the stored data. However, these systems do not document or record deletions of the stored data. A deleted marker can be added to the change feed records to simulate an update on delete. A deleted marker can be permanently removed after some time-period based on a configured time-to-live. However, the user or application may not read the change feed until after expiration of the time-to-live of the deleted marker. In such cases, the user or application may never know the document was deleted. This creates a silent failure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for creating a deletion notification in a change feed associated with a source data store storing data. The deletion notification includes a set of deletion record IDs identifying a set of records to be deleted and a tombstone sequence number (TSN) identifying a sequence of the deletion notification within a set of deletion notifications. A current deletion index deletion notification sequence number (DSN) within the change feed is incremented by one. A time-to-live (TTL) value is assigned to the deletion notification. The deletion notification is removed at expiration of a time-period corresponding to the TTL value. The set of records associated with the deletion notification are permanently deleted from the source data store.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
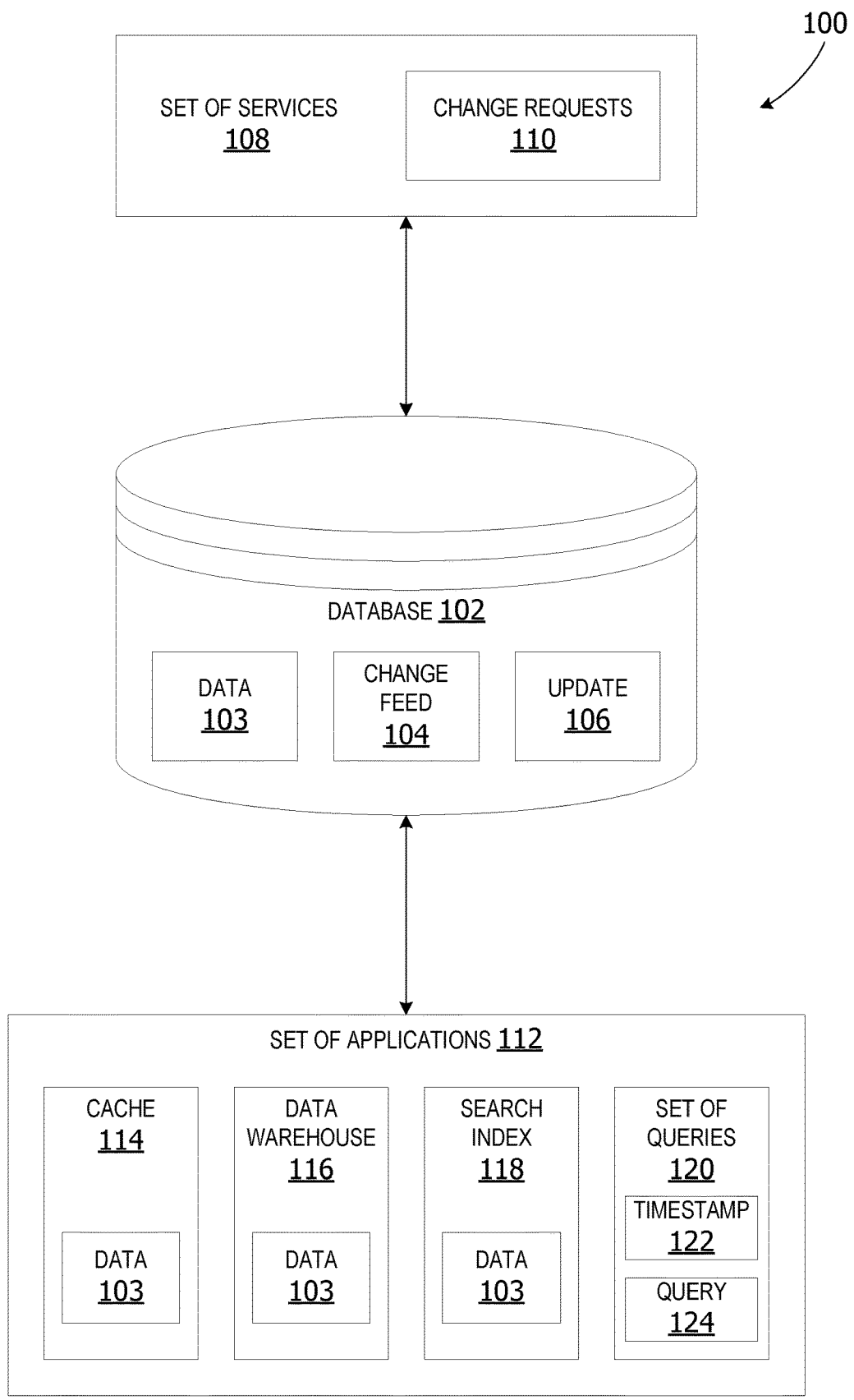
FIG. 1 is an exemplary block diagram illustrating a system 100 for processing delete requests using a change feed.

Some services, such as, but not limited to Azure IoT Hub, use database systems with a change feed feature for logging changes to data as the durable store. In one example, a database system, such as, but not limited to, CosmosDB system, provides this change feed logging feature enabling users to get a list of items in order of their modification time. The change feed also supports the ability to read the feed from an offset known as the transaction commit sequence number (LSN)/transaction timestamp "etag" which can be saved and used to resume reading the feed at the next unprocessed change entry. However, the change feed does not support deletes. An application which is reading and processing the entries in the change feed sequence is unaware of deletions because deleted records do not appear in the change feed. This can lead to missed updates and incorrect update behavior.

A 'deleted' marker can be added in the document to simulate an update on delete. The "deleted" marker on the record gets toggled or set to "true" when the document is deleted. This can lead to an ever-expanding number of deleted document entries in which the number of records for deleted documents can exceed the number of active records. This results in data explosion unless the deleted items data is eventually purged.

If the service supports expiration of records, a time-to-live (TTL) field can be added to the record. The deleted item record is deleted automatically at expiration of the TTL. However, this approach has the problem that a user may not read the change feed until after the TTL of a deleted document expires. In such cases, the user or application reading the change feed may never know that the document had been deleted making it impossible to determine which deletion updates were missed.

In one example, instead of making the request DELETE/recordId, the request is a PUT/recordId with content body {deleted:true, ttl: 3600} indicating an expiration time of one-hour. If the application or the server hosting the application goes down for time period greater than the TTL, the application may not read the change feed until after the expiration time, in which case, the entry would have been deleted from the change feed. The application never becomes aware that the delete happened.

Aspects of the disclosure provide a change feed component which creates a deletion notification in a change feed associated with a source data store storing data. The deletion notification includes a set of deletion record IDs identifying a set of records to be deleted and a tombstone sequence number (TSN) identifying a sequence of the deletion notification within a set of deletion notifications. The TSN is used to verify that no deletion notifications have been missed. This enables more accurate update of data using a change feed while reducing silent failure and reducing the number of times an entire snapshot of the source data has to be recopied into the destination data store. This reduces processor usage, reduces network bandwidth usage, reduces response time and improves reliability and accuracy of read-only data at the destination data store.

Other aspects provide a deletion sequence number (DSN) within the change feed which is incremented each time a deletion of a set of records occurs. The DSN is used to detect deletion update failure and prevent silent failures. This reduces failure in the destination data store, reduces processor resource usage and reduces error rate in data updates at the destination data store.

In other examples, this change feed component providing deletion updates enables processing of deletes from a source data store to a destination data store consistently and without any reliance on time. The DSN and TSN also provides a way to detect failure scenario and initiate recovery from failure events.

A current DSN within the change feed in other examples is incremented by one each time a deletion occurs. This helps in detection of missed deletion notifications, especially when all notifications have expired.

The change feed operates in an unconventional manner by including deletion notification records for incremental updates of destination data store and providing deletion sequencing to identify missed deletion updates. In this manner, the change feed is used in an unconventional way, and allows deletion record updates and detection of silent failures to reduce load on the system, thereby improving the functioning of the underlying computing device and preventing users reading incorrect or faulty data.

FIG. 1 is an exemplary block diagram illustrating a system 100 for processing delete requests using a change feed. The system 100 in some examples includes a source database 102 storing data 103. The data 103 in the source database 102 is constantly being modified by change requests 110 received from a set of services. The change requests 110 can include put, post and/or delete requests for writing (modifying) or deleting at least a portion of the data 103 in the database 102.

The database 102 can be any type of database or other data store on one or more data storage devices. A data storage device associated with the database 102 can include one or more different types of data storage devices, such as, for example, one or more rotating disks drives, one or more solid state drives (SSDs), and/or any other type of data storage device. The data storage device in some non-limiting examples includes a redundant array of independent disks (RAID) array. The data storage device may be included within a computing device, attached to the computing device, plugged into the computing device or otherwise associated with the computing device. In other examples, the database may be supported on one or more remote data storage accessed via a network, such as a data storage device on a remote computing device, a data storage in a remote data center, or a cloud storage.

A change feed 104 is maintained to track updates 106 (changes) to the data 103. The change feed 104 is an index of changes performed on the data 103 listed in the order in which the modifications to the data 103 are made. The changes or updates 106 are made in response to the change requests 110 received from the set of services 108.

The set of services 108 can include applications or other clients sending requests to read at least some of the data 103, write (modify) at least some of the data 103 and/or delete at least some of the data 103 (one or more records) in the database 102.

A read-only copy of the data 103 in the source database 102 is maintained by one or more applications in the set of applications 112 within one or more partitions. In some examples, a read-only copy of the data 103 is maintained by an application or service, such as, for example but without limitation, a cache 114, a data warehouse 116 and/or a search index 118. In some non-limiting examples, dozens or hundreds of servers and/or clients maintain a read-only copy of the data 103 in the source database 102.

The set of applications 112 utilizes the updates 106 received from the change feed 104 to update the local read-only copies of the data 103 to keep the local copy in sync with the data in the source database 102. In other words, information from the change feed is used to replicate updates to the data 103 occurring in the source database within the read-only copies maintained at destination data stores, such as the cache 114, the data warehouse 116, the search index 118 or any other destination data store.

Figure 2:
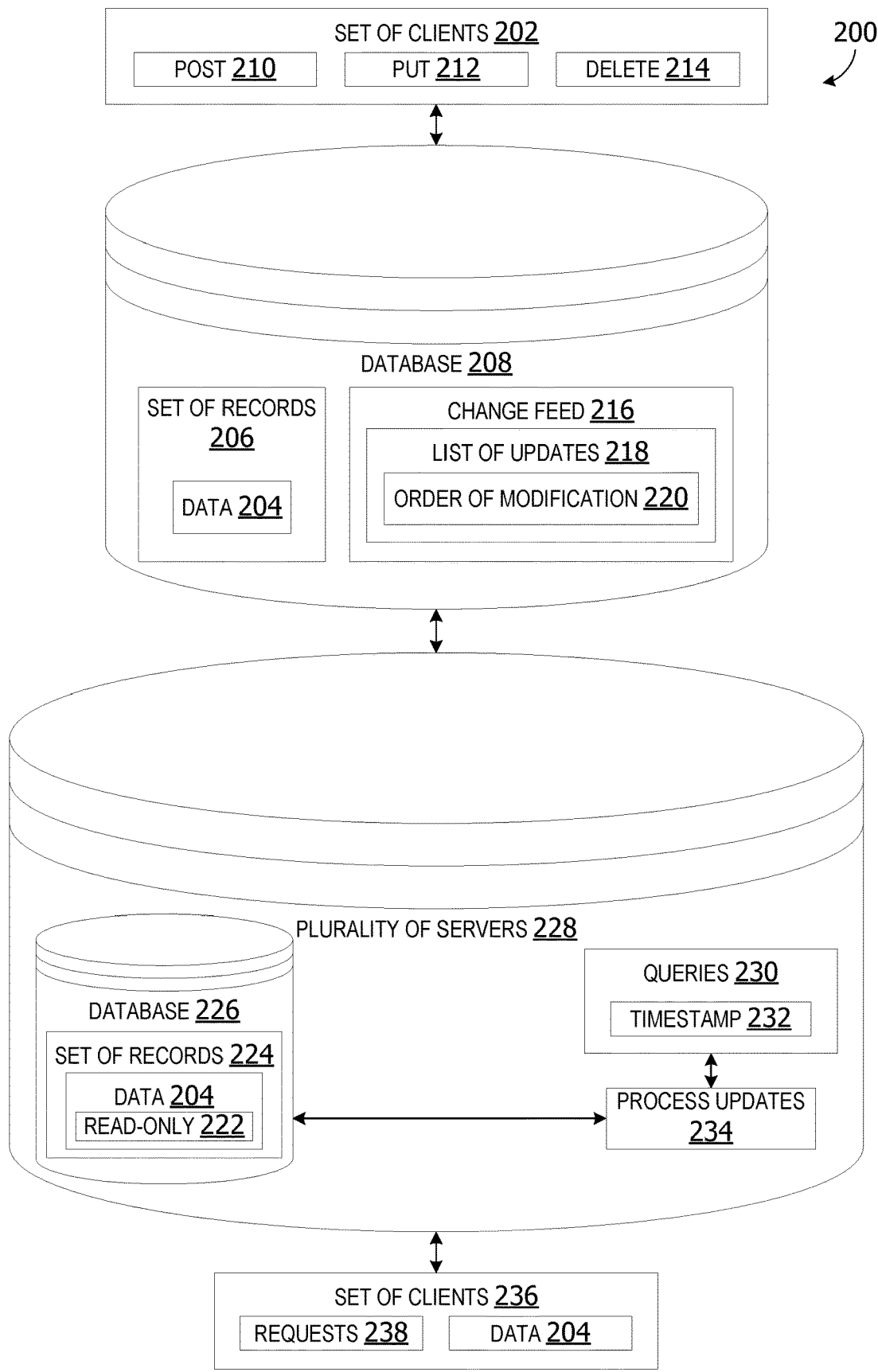
FIG. 2 is an exemplary block diagram illustrating a system 200 for updating a destination data store based on changes to a source data store.

FIG. 2 is an exemplary block diagram illustrating a system 200 for updating a destination data store based on changes to a source data store. In this non-limiting example, the set of one or more clients 202 make changes to data 204 in a set of records 206 stored in a source database 208 or other source data store. The source database 208 is a database for storing data implemented on one or more data storage devices, such as, but not limited to, the database 102 in FIG. 1. The set of clients 202 can modify the data 204 via one or more change requests, such as, but not limited to, a post 210 request, a put 212 request and/or a delete 214 request.

In some examples, post 210 creates a new record, put 212 updates a pre-existing record stored in the service, and delete 214 removes or erases a pre-existing record from a service. The post 210 and put 212 requests may also insert an entry into a sequence consisting of record changes with the new or updated record, while delete 214 does not.

The change feed 216 in this example is an index or log recording or otherwise tracking changes to the data 204. In other examples, the change feed is not an explicit component in the database. The database marks each record with a monotonically increasing transaction time during creates or updates. If the same records in updated twice, it would show up only once and deletes will never show up.

When data is written (modified) or deleted from the set of records 206, an entry is added to the change feed 216 to record the change. The change feed 216 in some examples includes a list of updates 218 made to the data 204 in the order of modification 220.

In some non-limiting examples, a plurality of servers 228 maintains one or more read-only copies of the data 204 in the set of records 206 within one or more partitions. The plurality of servers 228 send read queries 230 to the change feed 216 to obtain the list of updates 218. A query to the change feed 216 in some examples includes a timestamp 232 or LSN. The query requests a list of changes or records recording changes to the data 204 which were made since the given timestamp 232 included with the query. If the timestamp in a query is a logical time "t4" and the current timestamp is "t7", the change feed sends a list of updates 218 of all changes made to the data 204 during the interval starting at "t4" and ending at "t7." Thus, if one record was deleted at timestamp "t5" and two records were added at timestamp "t6", the list of updates sent to the requesting destination server includes a deletion notification identifying the deleted record at "t5" and one or more updates identifying the two records added at "t6."

The list of updates 218 are used to update the read-only 222 copy of the data 204 in the set of records 224 maintained at the destination database 226. When a client in a set of clients 236 sends one or more requests 238 to read data 204 from the destination database 226, the updates made based on the list of updates 218 obtained from the change feed 216 ensures the data served to the set of clients 236 in response is accurate (in sync) with the source copy on the database 208.

In some examples, if the timestamp 232 is at time "t0", a query is sent to read all the changes which have a timestamp after t0. If the page size is two, the returned updates returns return a maximum of two records. If the page size is one, a single record is returned. The next time a read query is sent at timestamp t2, the query requests all changes made to the source data store after time t2. In this manner, the system incrementally scans the data for change updates occurring in the sequence in which they are made. If the destination server goes down, one or more delete notifications may be deleted before the destination server is able to query for them. When the destination server comes back online and queries for changes since the last update at t2, the returned updates do not include the deletion notification records which have timed-out and been removed from the change feed 216. In such cases, the destination server in the plurality of servers is able to detect the missed deletion notifications by comparing the previous TSN for the last deletion notification processed at the destination server with the TSN for the next deletion notification to identify missing notifications.

If all deletion notifications have expired, then servers can query the DSN in the change feed to detect missed deletion notifications. The DSN is the most recent value of TSN as set on the source server. In some examples, there could be deletion notifications with TSN value less than DSN. Only the last deletion notification in this example has TSN set equal to the DSN.

In some examples, the system uses a deletion notification at the end containing the DSN without a TTL. On every delete operation, this last deletion notification is updated with the new DSN and hence it always appears after all other delete notifications. In this manner the destination server identifies situations in which the destination database 226 becomes out of sync with the source database 208.

Figure 3:
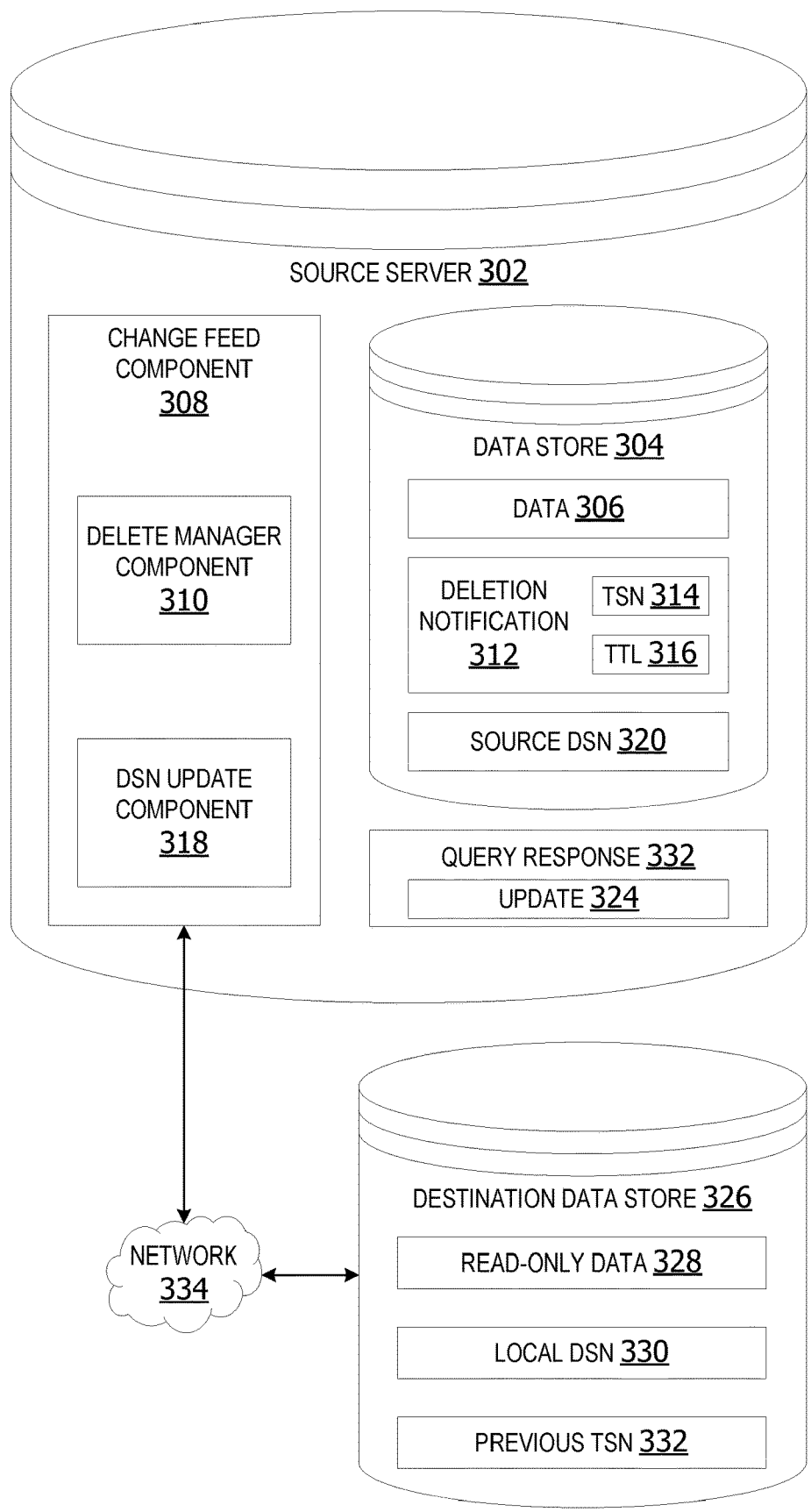
FIG. 3 is an exemplary block diagram illustrating a source server creating deletion notifications reflecting changes to a source data store used to update a destination data store.

FIG. 3 is an exemplary block diagram illustrating a source server 302 creating deletion notifications reflecting changes to a source data store used to update a destination data store. In some examples, the source server 302 includes a data store 304 storing data 306 which is changing due to write requests and delete requests received from one or more services, such as applications or clients.

A change feed component 308 maintains a change feed list or log of changes, such as, but not limited to, the change feed 104 in FIG. 1 and/or the change feed 216 in FIG. 2. When a write request (put or post) is received which modifies the data 306, the change feed component 308 creates a record in the change feed identifying the record and data entry change.

In some examples, when a delete request is received from an application, user or service, the change feed component 308 creates a deletion notification 312 in the change feed. The deletion notification is a record associated with deletion of one or more records. The deletion notification is added to the change feed updates. The deletion notification can be referred to as a tombstone record.

The deletion notification, in other examples, includes an identification of the deleted records and a TSN providing a deletion sequence or index number. The deletion notification 312 also includes a TTL 316. The TTL is a threshold wait-time until the deletion notification is deleted. In other words, when the deletion notification 312 is created, it is allowed to remain in the change feed list of updates until the TTL expires. A TTL can be any configurable time-period. In one non-limiting example, the TTL may be twenty-four hours.

Upon expiration of the TTL for a given deletion notification, a delete manager component 310 deletes the deletion notification. When the original record is deleted and the deletion notification identifying the deleted record is also deleted at the end of the TTL time-period, there is no additional record of the data deletion in the change feed or any other update data provided to the destination data store 326.

The delete manager component 310 periodically checks the TTL for each record in the change feed. The delete manager component can be referred to as a garbage collector component.

In an example, the delete manager component can check expiration of records every hour, every minute, every second or any other periodic time-period. When a TTL for a given record expires, the delete manager component 310 deletes the record. In one example, when the TTL assigned to a given deletion notification expires, the delete manager component 310 deletes the deletion notification from the change feed.

In some examples, a source DSN 320 is also maintained within a DSN entry of the change feed. The DSN is an index or sequence number identifying the number of deletion records per-partition. Since deletion records expire after the TTL, this is just the total number of deletion records ever created, not those that exist in the change feed at a certain point in time. The system maintains a local copy of the DSN for each partition of data. When something gets deleted in a given partition, the DSN for that given partition is incremented by one.

Each time a deletion notification is created, a DSN update component 318 increments the source DSN 320 by one. Thus, if the current source DSN 320 value is twelve (12) and a new deletion notification is created representing deletion of a set of three records from the source data store 304, the DSN update component 318 increments the source DSN 320 value by one for a new value of thirteen (13).

Updates are transmitted from the source server to a destination server hosting a destination data store 326. The change feed updates in some examples are received by the destination server from the source server via a network 334. The network may be implemented by one or more physical network components, such as, but without limitation, routers, switches, network interface cards (NICs), and other network devices. The network 334 can be any type of network for enabling communications with remote computing devices, such as, but not limited to, a local area network (LAN), a subnet, a wide area network (WAN), a wireless (Wi-Fi) network, or any other type of network. In this example, the network 334 may be a WAN, such as the Internet. However, in other examples, the network is a local or private LAN.

The destination data store 326 maintains a read-only data 328 copy of the data 306 in the source data store 304. A local deletion sequence number (DSN) 330 is maintained which can be compared to the source DSN 320 value. Each time the destination data store 326 is updated based on a deletion notification 312 to delete some data, the local DSN 330 is incremented by one or set equal to the TSN in the deletion record as that should be monotonically increasing if there were no missed deletion records. In this manner, the local DSN 330 should be equal to the source DSN 320 or only one less than the source DSN 320 because each time a delete occurs on the source database, an update is sent to the destination datastore which increments the local DSN in response. Eventually, the local DSN on destination should be equal to the source DSN.

The destination store could be much behind in processing the change feed and in that case, its local DSN can be less than source DSN by more than one. For example, if the local DSN is five, and the source DSN is nine, then deletion records with TSN between five and nine, such as values of 6, 7, 8, or 9, are present in the change feed (assuming they have not yet expired). Once the destination store has processed all deletion records, then the local DSN becomes equal to the source DSN.

If the local DSN 330 value is more than one off from the source DSN 320 value and there are no deletion records pending to be read from the change feed, it indicates the destination data store is out of sync with the source data store 304. Thus, if the local DSN 330 is equal to the source DSN or only one less than the source DSN 320 value, the destination data store 326 has not missed any deletion notifications and the read-only data 328 should be an accurate copy of the source data 306. If the local DSN 330 is two or more less than the value of the source DSN, the destination data store 326 has missed one or more deletion notifications and is no longer includes a faithful copy of the source data 306. Because the deletion notifications are deleted after the TTL time and the original records represented by the deletion notification is deleted when the deletion notification is created, there is no way to update the read-only data in the destination data store 326 using updates from the change feed. This enables the system to accurately detect missed deletion notifications and enact a recovery process to rebuild the destination data store 326 with an accurate copy of the data 306 in the source data store 304.

In other examples, the destination data store 326 maintains a previous TSN 332 record. The previous TSN 332 is the tombstone sequence number from the last deletion notification processed at the destination data store. The TSN 314 of the newly received deletion notification 312 is compared to the previous TSN 332 to determine if the new TSN 314 is in sequence with the previous TSN 332. For example, if the previous TSN 332 is seven (7) and the new TSN 314 of a deletion notification received in an update from change feed component 308 is eight (8), then the new deletion notification is in the correct sequence and no deletion notifications have been missed to due server failure or loss of communication with the source server. However, if the new TSN 314 is nine (9) and the previous TSN 332 is only seven (7), it indicates a missing deletion notification having the TSN of eight (8) which was never received. This gap in the tombstone sequence numbers indicates a missed deletion notification. The system can initiate a failure recovery process.

In some examples, the change feed component 308 receives as input a delete transaction request that includes a list of IDs of records to be deleted in a variable called "ids_to_delete." The change feed component 308 can read the deletion notification (tombstone) record with the ID for the most recent (latest) deletion notification and store it in an object "ctr." The change feed component 308 creates a new object of type "Tombstone" associate with the deletion notification. A representation of the DSN state on the source is as follows:

{dsn: u64}.

After a delete operation, the state changes to:

$dsn=dsn+1.$

The most recent deletion notification (tombstone) is updated with the new delete epoch and deleted record IDs. Also, this is equivalent to the DSN on the source data store. In the design, we create this record so that it appears in the change feed as the last deletion record. Since this record does not have TTL, it will not expire and destination will always eventually read this in the feed. The change feed component 308 creates a new object of type Tombstone as follows:

```
{
    tsn: u64,
    deleted_record_ids: Vec<string>,
    ttl: u64,
    _lsn: u64
}
```

After a delete operation, a deletion notification is added to the change feed that may look as follows:

```
{
    tsn: <dsn value from above>,
    deleted_record_ids: <records deleted in the operation>,
    ttl: <number of seconds in a day>
    _lsn: <transaction sequence number>
}
```

The object is stored in the deletion notification (tombstone) record. This is equivalent to the deletion notification discussed above. In this non-limiting example, the TTL gives the record a time-to-live of one day. The change feed component deletes the records with IDs in "ids_to_delete."

In some non-limiting examples, if the transaction is successfully executed, the change feed component 308 stores the latest transaction sequence number/transaction timestamp as the LSN. In other examples, the only state that is maintained on the destination is the TSN of the last processed deletion record and the checkpoint from which to resume reading the change feed. When the application starts up, it initializes a last known deletion notification (tombstone) state in-memory and periodically flushes that state to disk or persistent storage.

On processing a deletion notification, it gets updates as follows:

```
{
    last_seen_tsn: <tsn of the deletion notification>
    change_feed_checkpoint: <_lsn of the deletion notification>
}
```

At cold start, the values of both LSN and TSN are at zero. The value(s) can be initialized to the last known value from disk or persistent storage.

The change feed reader component does not rely on any temporal semantics for correctness and provides a deterministic way to process deleted records, identify a potential system failure and/or initiate a recovery mechanism. The failure recovery process can, for example, remove the destination data store 326 from use due to bad data and/or restore the data at the destination to the correct state. The destination data store 326 can be restored by deleting all the data from the destination data store and copying a new snapshot of all the data in the source data store 304 over to the destination data store 326.

Figure 4:
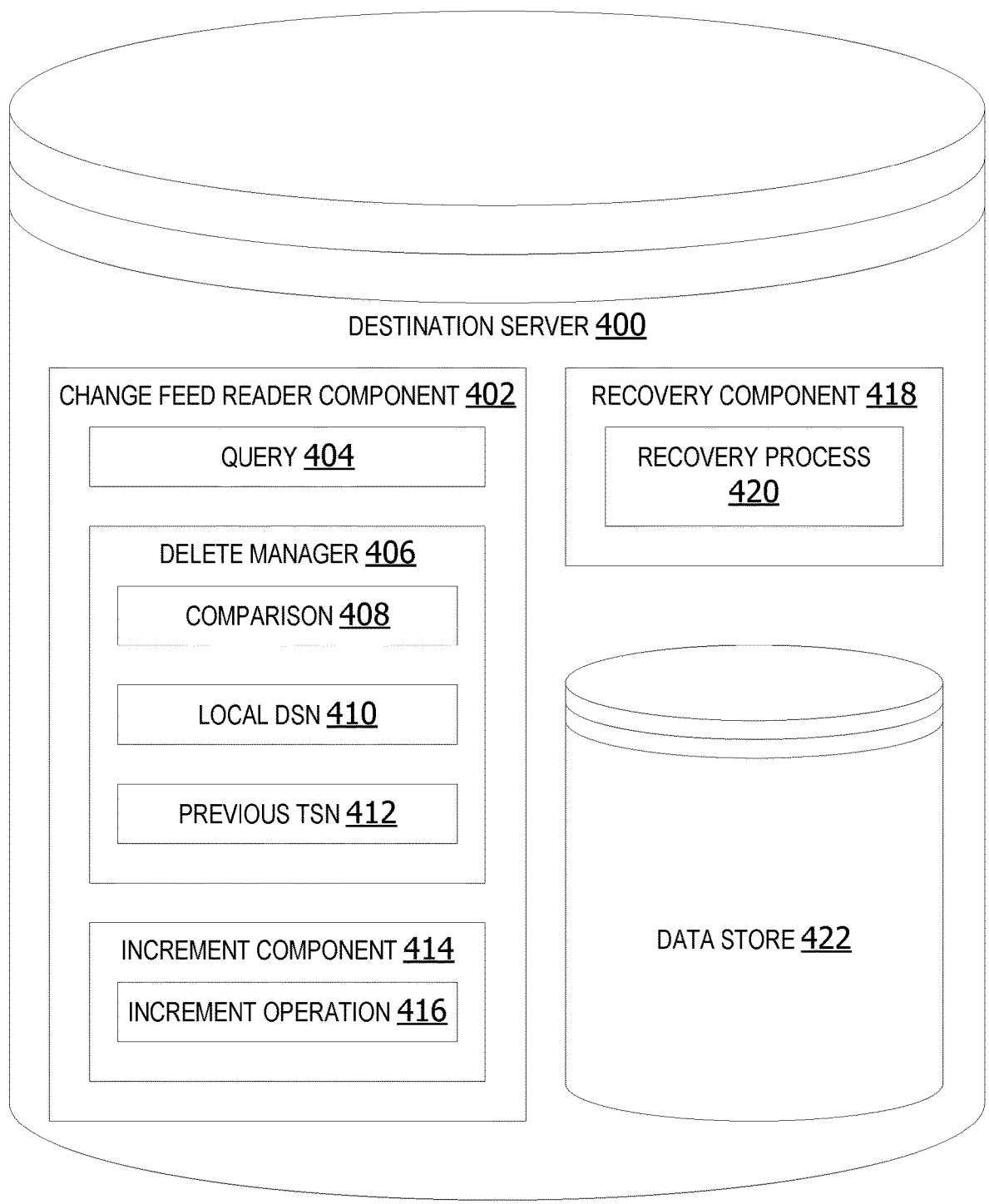
FIG. 4 is an exemplary block diagram illustrating a destination server updating a data store and initiating a recovery process when data become out of sync with the source data store.

FIG. 4 is an exemplary block diagram illustrating a destination server 400 updating a data store and initiating a recovery process when data become out of sync with the source data store. In some examples, the destination server 400 is a server hosting a destination data store 422. The destination server can be implemented as, for example but without limitation, any database system using change feed processor or similar technology and building applications or systems that process stream of changes to maintain state.

The destination data store 422 stores data such as, but not limited to, a copy of data in a source data store. The destination data store 422 may be implemented within a partition in a plurality of partitions. The destination data store 422 can optionally include a database, such as, but not limited to, the database 226 in FIG. 2.

The destination server 400 in some examples includes a change feed reader component 402. The change feed reader component 402 sends a query to change feed component 308 on a source server, such as, but not limited to, the change feed component 308 in FIG. 3. The change feed reader component 402 receives an update from the change feed on the source server.

If a deletion notification is received in the update, the change feed reader component 402 makes a comparison 408 of a locally maintained DSN 410 value with the value of a current DSN provided in the update. The current DSN value is a source DSN indicating a deletion sequence, such as, but not limited to, the source DSN 320 in FIG. 3. If the local DSN and the source DSN are equal or the local DSN is only one less than the source DSN, the deletions are up to date. A difference of one indicates that no deletion has been missed. The deletions are up to date after applying the deletion record, after which the local and source DSN become same. Only when local and source DSN are equal is when we can say that destination and source are in sync with respect to deleted records.

However, if the local DSN 410 value is two or more less than the current DSN provided in the most recent deletion notification from the change feed, the destination server has missed one or more of the deletion notifications. In such case, a recovery component 418 initiates a recovery process 420. The recovery process takes the local data store 422 offline or otherwise makes the local data in the local data store 422 unavailable to users, applications or other services reading data from the data store 422, as the data is not an accurate copy of the source data.

In other examples, the change feed reader component compares a local copy of a previous TSN 412 obtained from the last processed deletion notification (tombstone) record with the current TSN in the newly received deletion notification provided by the change feed update from the source server. The current TSN is obtained from a deletion notification received from the change feed in a change feed update. When a given delete operation occurs on the source server, the system creates a delete notification with a TTL dictating how long the deletion notification remains in the change feed before being deleted. The TSN on the source server is incremented by one to reflect the delete operation.

The previous TSN value is the TSN value associated with the read-only version of the data on the destination data store. When the last deletion notification in the change feed is processed on the destination server, the previous TSN should be equal to the DSN on the source data store. The change feed is ordered by modification time. A deletion notification on the destination server waiting to be processed does not have a TTL associated with it. The deletion notification remains until the destination server processes the deletion notification to update the read-only data on the destination datastore.

If the current TSN in the new (unprocessed) deletion notification is equal to the previous TSN or only one more than the previous TSN for the last processed deletion notification (deletion notification), it indicates no deletion notifications from the change feed have been lost or otherwise missed. Therefore, the local data in the local data store is accurate. However, the current TSN of the newly received and unprocessed deletion notification received from the change feed is two or more greater than the previous TSN, it indicates one or more deletion notifications have been missed. In such case, the recovery component 418 initiates a recovery process 420.

In some examples, an increment component 414 performs an increment operation 416 each time an update to the data on the data store 422 based on a deletion notification occurs. The increment operation can include incrementing the DSN by one each time a deletion of a set of records occurs.

Each time a deletion notification is created in the change feed, the delete manager component 310 on the source server 302 assigns the deletion notification a TSN value that is incremented one higher than the previous TSN for the last deletion notification, as shown in FIG. 3 above. Incrementing the TSN on a delete operation is done on the source. However, in some non-limiting examples, the increment component increments the value of the TSN each time a new deletion notification is generated.

When a set of records is deleted, in some examples, the change feed reader component 402 reads from the change feed a deletion notification record. The DSN and/or the TSN associated with the deletion notification are used by the change feed reader component to handle processing of deleted records and detect if the system has reached a failure state from which it cannot recover. When such a failure is detected, the system drops its internal state and begins rebuilding the server.

In some examples, the change feed reader component 402 reads a record from the change feed and processes that record. After an app fails ungracefully, it loses its in-memory state and initializes itself from the persisted state. The in-memory state is saved in some examples.

In other non-limiting examples, the change feed that the application reads is contiguous subsequence of the change feed with the source database. The DSN and/or the TSN are used to verify that the application/destination database state and source database state are either in sync with each other or there is a pending update in the change feed to be processed by the application. If a deletion notification having an expired TTL in the change feed associated with a change update which is removed from the change feed at the source prior to processing at the destination server, this could lead to missing or out-of-sync data. In such cases, a recovery operation is run on the application. The TSN associated with this deletion notification gets purged from the source server at expiration of the TTL to avoid data explosion.

In this manner, the change feed reader utilizing the DSN and the TSN helps build a highly available service providing strongly consistent view of the data stored in the durable read-only data store at a very high performance.

Figure 5:
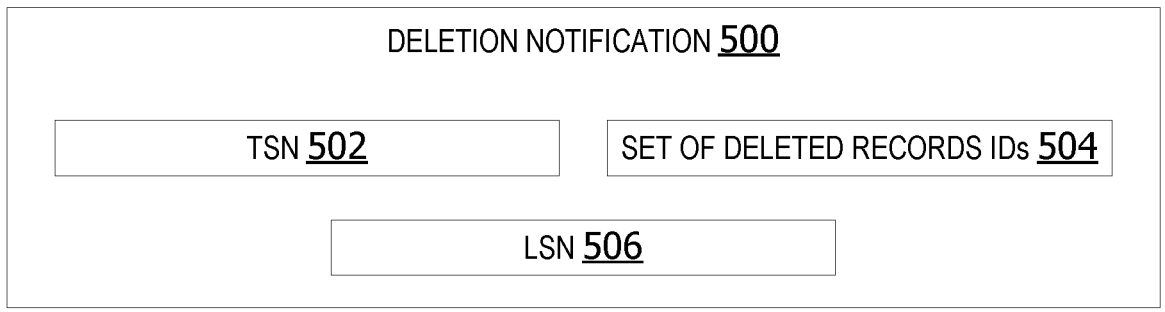
FIG. 5 is an exemplary block diagram illustrating a deletion notification having a tombstone sequence number (TSN).

FIG. 5 is an exemplary block diagram illustrating a deletion notification 500 having a TSN 502. The deletion notification 500 can represent a deletion of a single record or a deletion of multiple records (two or more records). The set of deleted records IDs 504 included within the deletion notification 500 includes a record identifier (ID) for each deleted record. If a single record is deleted, the set of deleted records IDs 504 includes only the single ID for that record. If three records are deleted during a single transaction, the set of deleted records IDs 504 includes three record IDs identifying each of the three deleted records.

The TSN 502 is the tombstone sequence number 502 for the deletion notification 500. The tombstone sequence number is incremented each time another deletion notification is created. The deletion notification does not include the DSN.

The last committed transaction sequence number (LSN) 506 is a sequence number for each transaction. In some examples, the deletion notification is a 'TombstoneRecord' that can be represented as follows:

```
struct TombstoneRecord
{
id: String,
delete_epoch: u64,
deleted_record_ids: Vec<String>,
_lsn: u64
}
``` where the term "delete_epoch" represents the TSN, which is a monotonically incrementing number that is incremented whenever a set of records is deleted. The term "deleted_record_ids" represents the list of identifiers (IDs) of records which are deleted. The LSN (_lsn) is the transaction commit sequence number which executed the delete operation.

When a set of documents are deleted, then in the same transaction, the deletion notification record is updated with the list of IDs of the deleted records for a single transaction or single deletion request. If a single deletion notification record had the list of all record IDs from the beginning that have been deleted, the list would grow causing another data explosion situation, although its only within one record.

In one example, a deletion notification record with a known identifier, 'CURRENT_TOMBSTONE' is provided. At cold start, it can be represented as follows:

```
id:'CURRENT_TOMBSTONE',
delete_epoch:0, deleted_record_ids:[ ],
_lsn:0}.
```

In every delete transaction, a copy of this record is created with a different ID. This record is updated with the new set of deleted record IDs. A TTL is added on the copy record so that the record gets automatically deleted after the expiration time. This prevents from data explosion as all deleted records and their deletion notification records eventually get deleted from the system. This also helps in identifying if the application reading the change feed has fallen behind more than the TTL duration and must begin recovery action.

The deletion notifications, providing logical version numbers for deletion notification and missed deletion detection, does not have any reliance on time or other such non-deterministic factors. This deletion notification provides a deterministic way to handle consistent processing of delete requests using a change feed of updates. It further provides a way to detect if the system is in a failed state and provides a way to recover from it as well.

Figure 6:
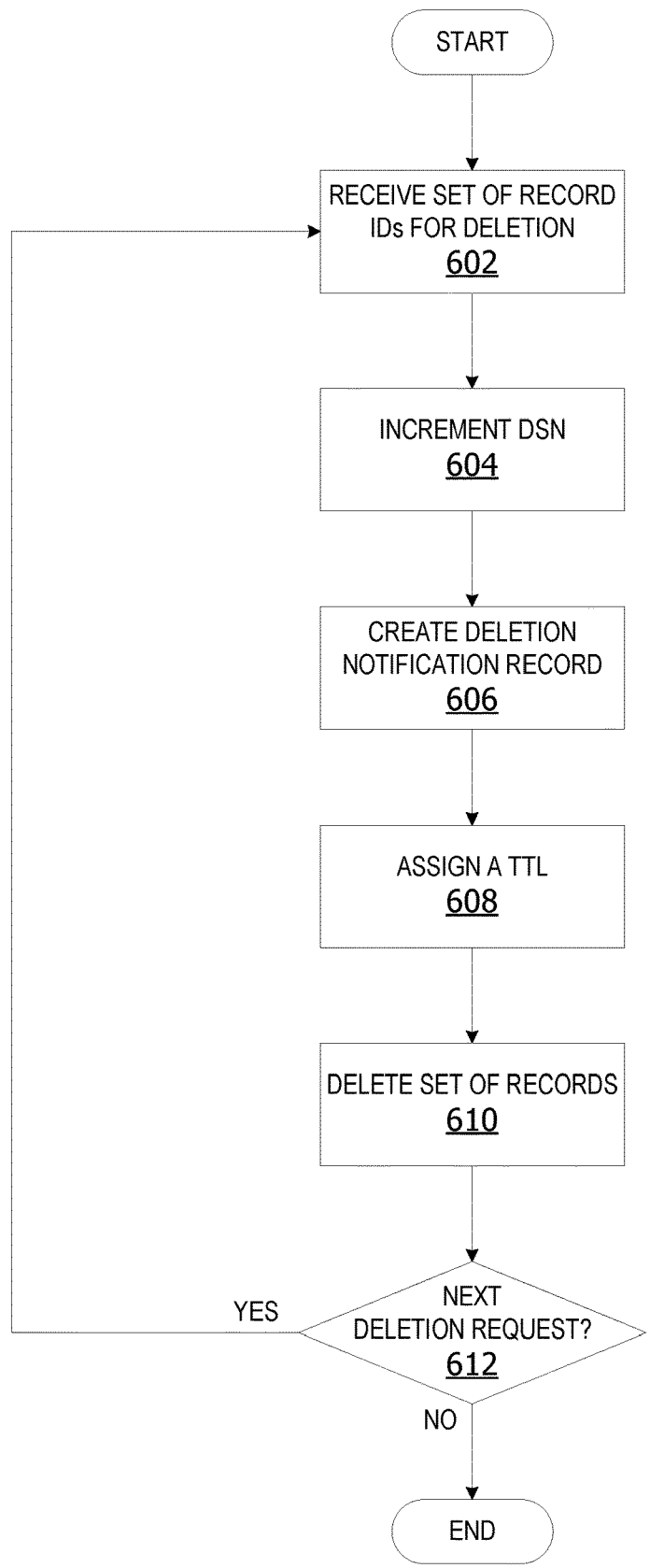
FIG. 6 is an exemplary flow chart illustrating operation of the computing device to delete records and update a change feed, including the TSN.

FIG. 6 is an exemplary flow chart illustrating operation of the computing device to delete records and update a change feed, including the TSN. The process shown in FIG. 6 is performed by a change feed component, executing on a computing device, such as the computing device 1000 of FIG. 10.

The process begins by receiving a set of record IDs for deletion at 602. The set of record IDs are received in a delete request from a user, application, or service. The DSN is incremented immediately prior to creating the deletion notification record or as the deletion notification record is being created AT 604. The change feed component creates a deletion notification record at 606. The deletion notification record can be referred to as a tombstone record. The change feed component creates (assigns) a TTL for the deletion notification record at 608. The set of records are deleted from the source data store at 610.

A determination is made whether a next deletion request is received at 612. If yes, the change feed component iteratively executes 602 through 612 until no additional deletion request is received. The process terminates thereafter.

The deletion notification record contains the latest value of DSN as the TSN. The record deletion, creation of the deletion notification record, TTL creating, and DSN incrementing happens as a transaction. If any step fails, then the transaction rolls back to previous state.

While the operations illustrated in FIG. 6 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 6.

Figure 7:
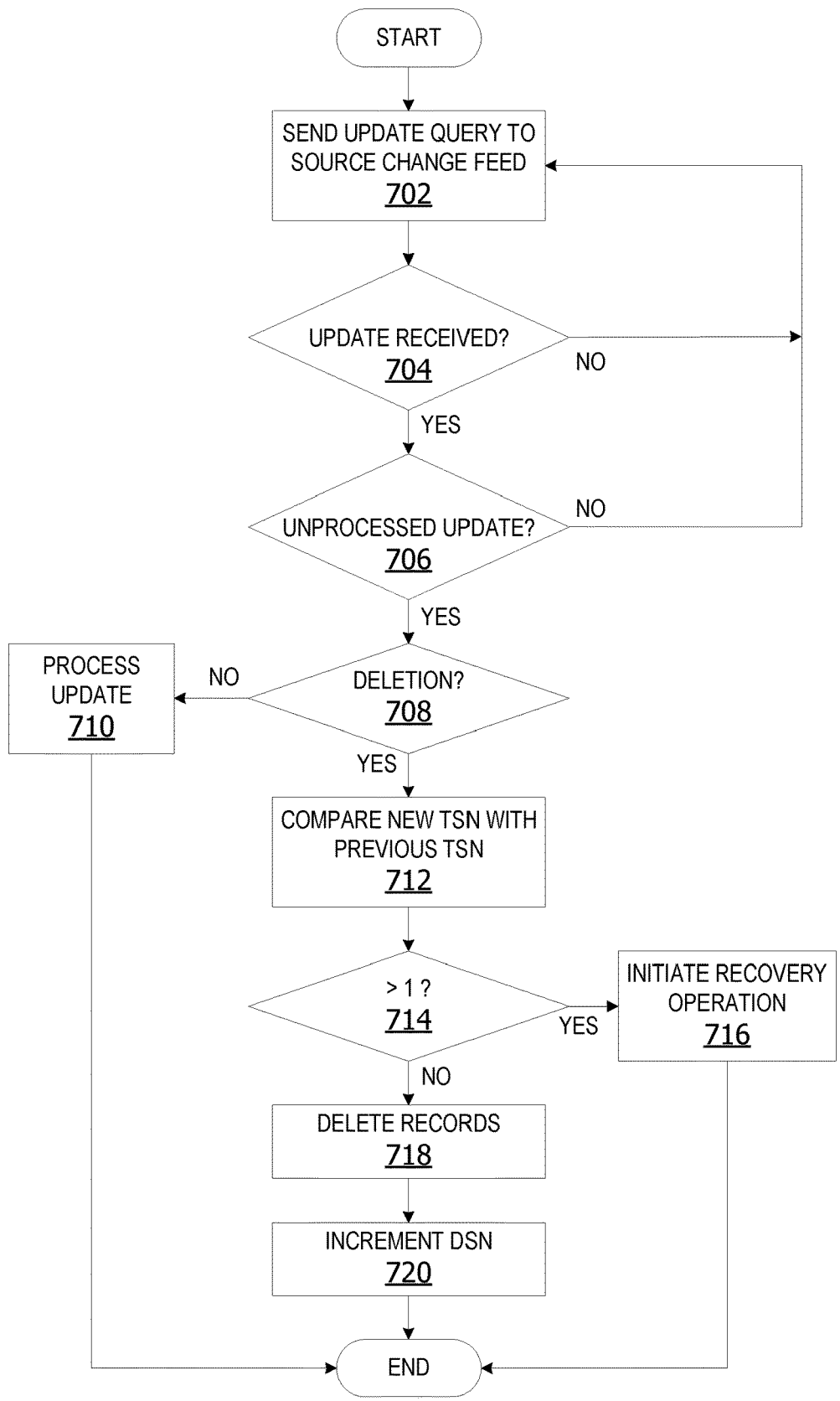
FIG. 7 is an exemplary flow chart illustrating operation of the computing device to update a local data store based on change feed updates received from a source server.

FIG. 7 is an exemplary flow chart illustrating operation of the computing device to update a local data store based on change feed updates received from a source server. The process shown in FIG. 7 is performed by a change feed component or a change feed reader component, executing on a computing device, such as the computing device 1000 of FIG. 10.

The process begins by sending a read query to a source change feed at 702. The read query requests all updates to the source data store after a given timestamp. A determination is made whether the update is received at 704. If yes, a determination is made whether the update is an unprocessed update at 706. An unprocessed update is an update which has not previously been received and processed to update the local data store. If yes, a determination is made whether the update includes an unprocessed deletion notification at 708. If no, the update is processed at 710 and the process terminates thereafter.

Returning to 708, if the update includes a deletion notification, the change feed reader compares the new TSN in the deletion notification with the previous TSN at 712. A determination is made whether the new TSN is more than one greater than the previous TSN at 714. If yes, the recovery operation is initiated at 716. The process terminates thereafter.

If the TSN of the new deletion notification is not more than one greater than the previous TSN, the records are deleted from the local data store at 718. The DSN is incremented by one at 720. The process terminates thereafter.

While the operations illustrated in FIG. 7 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 7.

Figure 8:
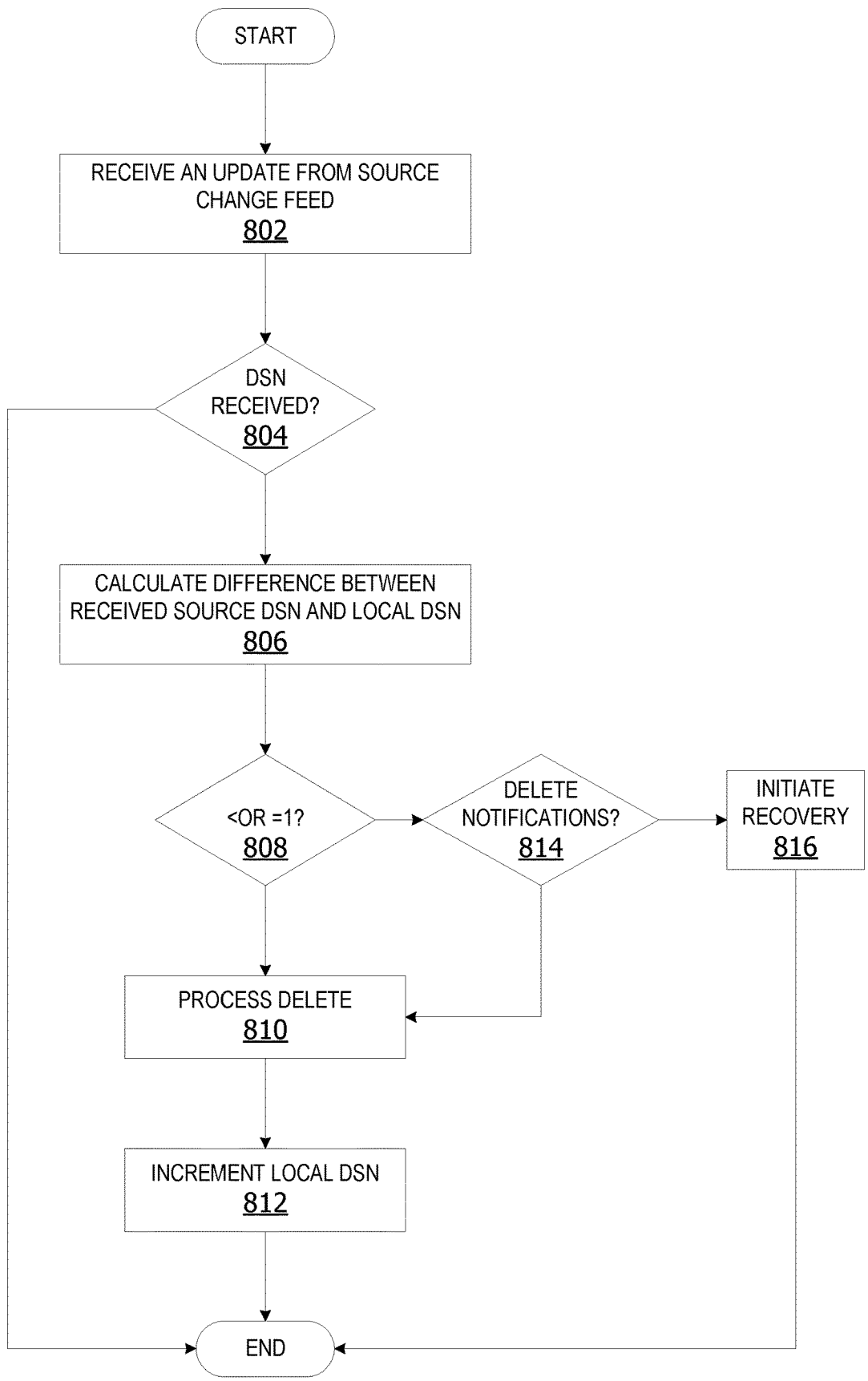
FIG. 8 is an exemplary flow chart illustrating operation of the computing device to update a local data store based on updates from a change feed.

FIG. 8 is an exemplary flow chart illustrating operation of the computing device to update a local data store based on updates from a change feed. The process shown in FIG. 8 is performed by a change feed component or a change feed reader component, executing on a computing device, such as the computing device 1000 of FIG. 10.

The process begins by receiving an update from a source change feed at 802. A determination is made whether a DSN is received with the update at 804. If yes, the change feed reader component calculates the difference between the received source DSN and the local DSN at 806. A determination is made whether the difference is less than or equal to one at 808. If yes, the delete is processed at 810. The local DSN is incremented at 812 to reflect the processed delete notification.

If the difference between the source DSN and the local DSN is greater than one, a determination is made as to whether there are unprocessed delete notifications at 814. If no, a recovery process is initiated at 816. The process terminates thereafter. If there are unprocessed delete notifications, the data may still be in sync. For example, if the destination DSN is at six and the source DSN is at eight, the difference between the source and destination DSN values is greater than one. However, if there are two unprocessed deletion notifications remaining in the change feed waiting to be processed at the destination, then the destination is not out of sync with the source, as the destination DSN will be incremented by two when the two pending deletion notifications are completely processed to update the data at the destination.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

Figure 9:
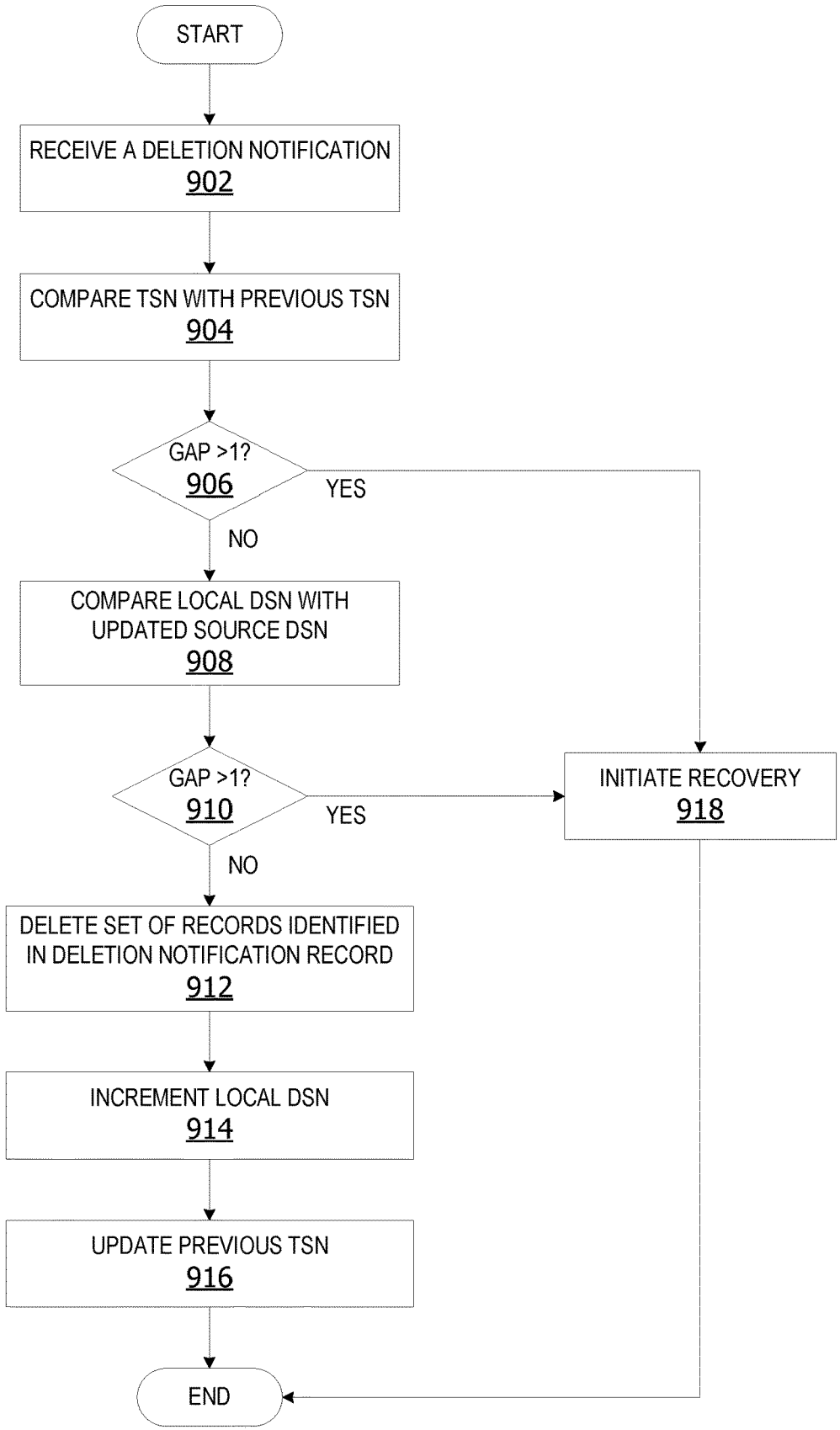
FIG. 9 is an exemplary flow chart illustrating operation of the computing device to detect data inconsistency between a source data store and a local read-only copy of the data.

FIG. 9 is an exemplary flow chart illustrating operation of the computing device to detect data inconsistency between a source data store and a local read-only copy of the data. The process shown in FIG. 6 is performed by a change feed component or a change feed reader component, executing on a computing device, such as the computing device 1000 of FIG. 10.

The process begins by receiving a deletion notification at 902. The new TSN for the deletion notification is compared to the local copy of the previous TSN at 904. A determination is made whether the difference between the previous TSN and the new TSN is greater than one at 906. If no, the change feed reader component compares the local DSN with the updated source DSN provided by the change feed update at 908 to determine if data is out of sync. A determination is made whether there is a gap between the two sequences greater than one at 910 with no pending deletion notifications remaining in the change feed. If no, the set of records identified in the deletion notification is deleted from the local data store at 912. The local DSN is incremented by one at 914. The previous TSN is updated to the TSN value of the deletion notification at 916.

If the gap between the TSN and the previous TSN is greater than one at 906, a recovery operation is initiated at 918. Likewise, if the gap between the local DSN and the source DSN received in the change feed update, the recovery operation is initiated at 918. The process terminates thereafter.

While the operations illustrated in FIG. 9 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 9.

Additional Examples

Some aspects and examples disclosed herein are directed to a system, method and/or computer executable instructions for processing delete requests with change feed comprising: a processor; and a computer-readable medium storing instructions that are operative upon execution by the processor to: create a deletion notification in a change feed associated with a source data store storing data, the deletion notification comprising a set of deletion record IDs identifying a set of records to be deleted and a TSN identifying a sequence of the deletion notification within a set of deletion notifications; increment a current DSN within the change feed, the DSN identifying a number of deletion notifications generated on the change feed; assign a TTL value to the deletion notification, wherein the deletion notification is removed at expiration of a time-period corresponding to the TTL value; and delete the set of records associated with the deletion notification.

Additional aspects and examples disclosed herein are directed to a system, method or computer executable instructions for creating a deletion notification in a change feed associated with a source data store storing data, the deletion notification comprising a set of deletion record IDs identifying a set of records to be deleted and a TSN identifying a sequence of the deletion notification within a set of deletion notifications; incrementing a current DSN within the change feed, the DSN identifying a number of deletion notifications generated on the change feed; assigning a TTL value to the deletion notification, wherein the deletion notification is removed at expiration of a time-period corresponding to the TTL value; and deleting the set of records associated with the deletion notification.

Additional aspects and examples disclosed herein are directed to a system, method and/or one or more computer storage devices having computer-executable instructions stored thereon for processing delete requests using sequence numbers with change feed, which, on execution by a computer, cause the computer to perform operations comprising: creating a deletion notification in a change feed associated with a source data store storing data, the deletion notification comprising a set of deletion record IDs identifying a set of records to be deleted and a TSN identifying a sequence of the deletion notification within a set of deletion notifications; incrementing a current DSN within the change feed, the DSN identifying a number of deletion notifications generated on the change feed; assigning a TTL value to the deletion notification, wherein the deletion notification is removed at expiration of a time-period corresponding to the TTL value; and deleting the set of records associated with the deletion notification.

In an example scenario, a database system, such as CosmosDB, executes delete and update operations per-transaction using the LSN, DSN and/or the TSN in the change feed to detect failures. Any application which reads a feed of update changes to maintain local state in a database can utilize the per-partition DSN and/or TSN to process deletion notifications and detect missed deletion notifications to trigger a recovery operation.

In other examples, the system executes transactions on the data stored in a service. Every record updated in a transaction is assigned a monotonically increasing LSN which is a transaction commit sequence number. The entries in the change feed include the latest LSN for the record. The LSN is used to track updates associated with both put and post requests, as well as deletes.

When a data document is deleted, a temporary deletion notification record is inserted. It inserts a temporary deletion notification record for the deleted document. A permanent deletion notification record is updated with the latest delete epoch TSN and transaction LSN. It also updates the change feed and inserts new and updated documents. The order of documents inserted in the change feed are batched per transaction but their ordering within the batch may not be guaranteed.

The system in other systems simulates a recovery operation on an application which is equivalent to purging all the application state and rehydrating the data from the database by reading the change feed from the beginning. After the recovery is complete, the in-memory app state will be in sync with the database state and processed all the records from the change feed.

In other non-limiting examples, a record from the change feed is processed only if its LSN is greater than or equal to the last checkpointed LSN. The change feed is only read from the last checkpointed LSN. If the record read is a data document, then the application updates its in-memory state. Else, if it's a deletion notification record and the tombstone epoch is at most 1 ahead of the application's delete epoch, then the record is processed, and the application deletes the document from in-memory state. If the tombstone epoch is two or more ahead of the application's delete epoch, then the application has missed a delete and runs the recovery operation.

In an example scenario, when a record "R1" is deleted, a deletion notification record (TM) is created. A sequence number for the deletion is incremented by one. An entry is created for the deletion notification including the TSN and another entry is created for the DSN. The destination server reads these two entries and tracks the sequence numbers. If the DSN is twenty-two in the new update but the destination servers local DSN is only twenty, the system knows there is a missing number in sequence of delete notifications. When this occurs, a recovery process can rebuild the server to prevent serving bad data to requesting clients.

Likewise, in another example, if the TSN for a deletion notification is TM 7 and the previous TSN on the destination database is TM 5, the system recognizes that a deletion TM 6 is missing or was not received. This indicates the data is out of sync with the source data store. This provides a simple, scalable system which is more computationally efficient due to lower propagation of data between source and destination. It is an incremental approach with prevention of safety violation and accurate detection of missing a delete without data quality loss.

Alternatively, or in addition to the other examples described herein, examples include any combination of the following:
- compare a local DSN value associated with a read-only version of the data on the source data store with the current DSN obtained from the deletion notification in a change update received from the change feed to identify a difference between the local DSN value and a value of the current DSN;
- delete a set of records from the destination data store identified in the set of deleted records IDs in the deletion notification and increment the local DSN value by one in response to the difference between the local DSN value and the value of the current DSN equal to one;
- initiate a recovery operation responsive to the difference between the local DSN value and the value of the current DSN equal to two or more;
- compare a previous TSN value associated with a read-only version of the data on the destination data store with the TSN obtained from the deletion notification received from the change feed in a change update to identify a difference between the previous TSN value and a value of the current TSN;
- delete a set of records from the destination data store identified in the set of deleted records IDs in the deletion notification responsive to the difference between the previous TSN and the current TSN equal to one;
- replace the value of the previous TSN with the value of the current TSN value; and
- initiate a recovery operation responsive to the difference between the previous TSN value and the value of the current TSN equal to two or more.

While the aspects of the disclosure have been described in terms of various examples with their associated operations, a person skilled in the art would appreciate that a combination of operations from any number of different examples is also within scope of the aspects of the disclosure.

Example Operating Environment

Figure 10:
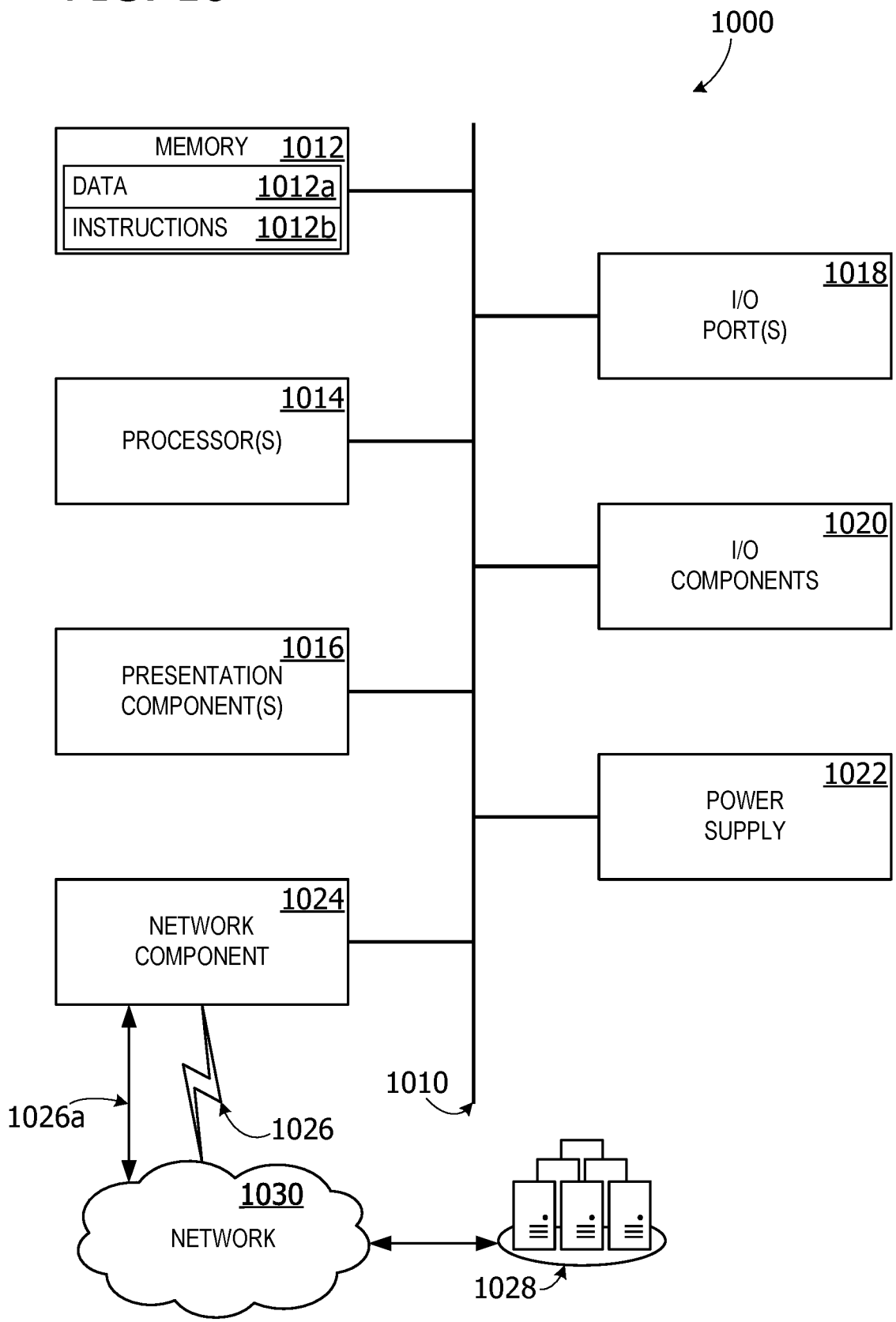
FIG. 10 is exemplary block diagram illustrating an example computing environment suitable for implementing some of the various examples disclosed herein.

FIG. 10 is a block diagram of an example computing device 1000 for implementing aspects disclosed herein and is designated generally as computing device 1000. Computing device 1000 is an example of a suitable computing environment and is not intended to suggest any limitation as to the scope of use or functionality of the examples disclosed herein. Neither should computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1000 includes a bus 1010 that directly or indirectly couples the following devices: computer-storage memory 1012, one or more processors 1014, one or more presentation components 1016, I/O ports 1018, I/O components 1020, a power supply 1022, and a network component 1024. While computing device 1000 is depicted as a seemingly single device, multiple computing devices 1000 may work together and share the depicted device resources. For example, memory 1012 may be distributed across multiple devices, and processor(s) 1014 may be housed with different devices.

Bus 1010 represents what may be one or more busses (such as an address bus, data bus, or a combination thereof). Although the various blocks of FIG. 10 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 10 and the references herein to a "computing device." Memory 1012 may take the form of the computer-storage media references below and operatively provide storage of computer-readable instructions, data structures, program modules and other data for computing device 1000. In some examples, memory 1012 stores one or more of an operating system, a universal application platform, or other program modules and program data. Memory 1012 is thus able to store and access data 1012a and instructions 1012b that are executable by processor 1014 and configured to carry out the various operations disclosed herein.

In some examples, memory 1012 includes computer-storage media in the form of volatile and/or nonvolatile memory, removable or non-removable memory, data disks in virtual environments, or a combination thereof. Memory 1012 may include any quantity of memory associated with or accessible by computing device 1000. Memory 1012 may be internal to computing device 1000 (as shown in FIG. 10), external to computing device 1000 (not shown), or both (not shown). Examples of memory 1012 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1000. Additionally, or alternatively, memory 1012 may be distributed across multiple computing devices 1000, for example, in a virtualized environment in which instruction processing is carried out on multiple computing devices 1000. For the purposes of this disclosure, "computer storage media," "computer-readable medium", "computer-storage memory," "memory," and "memory devices" are synonymous terms for computer-storage memory 1012, and none of these terms include carrier waves or propagating signaling.

Processor(s) 1014 may include any quantity of processing units that read data from various entities, such as memory 1012 or I/O components 1020 and may include CPUs and/or GPUs. Specifically, processor(s) 1014 are programmed to execute computer-executable instructions for implementing aspects of the disclosure. The instructions may be performed by the processor, by multiple processors within computing device 1000, or by a processor external to client computing device 1000. In some examples, processor(s) 1014 are programmed to execute instructions such as those illustrated in the in the accompanying drawings. Moreover, in some examples, processor(s) 1014 represent an implementation of analog techniques to perform the operations described herein. For example, the operations may be performed by an analog client computing device 1000 and/or a digital client computing device 1000. Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. I/O ports 1018 allow computing device 1000 to be logically coupled to other devices including I/O components 1020, some of which may be built in. Example I/O components 1020 include, for example but without limitation, a microphone, joystick, game pad, satellite dish, scanner, printer, wireless device, etc.

Computing device 1000 may operate in a networked environment via network component 1024 using logical connections to one or more remote computers. In some examples, network component 1024 includes a network interface card and/or computer-executable instructions (e.g., a driver) for operating the network interface card. Communication between computing device 1000 and other devices may occur using any protocol or mechanism over any wired or wireless connection. In some examples, network component 1024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1024 communicates over wireless communication link 1026 and/or a wired communication link 1026a to a cloud resource 1028 across network 1030. Various different examples of communication links 1026 and 1026a include a wireless connection, a wired connection, and/or a dedicated link, and in some examples, at least a portion is routed through the internet.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for processing delete requests using sequence numbers with change feed, the system comprising:
   a computer-readable medium storing instructions that are operative upon execution by a processor to:
      create a deletion notification in a change feed associated with a source data store storing data, the deletion notification comprising a set of deletion record IDs identifying a set of records for deletion and a tombstone sequence number (TSN) identifying a sequence of the deletion notification within a set of deletion notifications;
      assign a time-to-live (TTL) value to the deletion notification, wherein the deletion notification, including the TSN, is removed from the change feed at expiration of a time-period corresponding to the TTL value;
      responsive to creating the deletion notification, increment a current deletion notification sequence number (DSN) within the change feed, wherein the DSN persists in the change feed to identify a total number of deletion notifications generated on the change feed; and
      responsive to receiving a query from a destination data store, provide a change update to the destination data store to delete the set of records associated with the deletion notification.

2. The system of claim 1, wherein the instructions are further operative to:
   compare a local DSN value associated with a read-only version of the data on the destination data store with the current DSN obtained from the deletion notification in the change update received from the change feed to identify a difference between the local DSN value and a value of the current DSN.

3. The system of claim 2, wherein the instructions are further operative to:
   delete the set of records from the destination data store identified in the set of deletion records IDs in the deletion notification responsive to the difference between the local DSN value and the value of the current DSN being equal to one; and
   increment the value of the local DSN value by one, wherein the local DSN value is incremented by one each time the destination data store is updated based on a new deletion notification in a new change update received from the change feed.

4. The system of claim 2, wherein the instructions are further operative to:
   initiate a recovery operation responsive to the difference between the local DSN value and the value of the current DSN being equal to two or more.

5. The system of claim 1, wherein the instructions are further operative to:
   compare a previous TSN value associated with a read-only version of the data on the destination data store with the TSN obtained from the deletion notification received from the change feed in a change update to identify a difference between the previous TSN value and a value of a current TSN.

6. The system of claim 5, wherein the instructions are further operative to:
deleting a set of records from the destination data store identified in the set of deleted records IDs in the deletion notification responsive to the difference between the previous TSN value and the current TSN value being equal to one; and
replace the value of the previous TSN with the value of the current TSN value.

7. The system of claim 5, wherein the instructions are further operative to:
initiate a recovery operation responsive to the difference between the previous TSN value and the value of the current TSN being equal to two or more.

8. A method of processing delete requests using sequence numbers with change feed, the method comprising:
creating, by a change feed component, a deletion notification in a change feed associated with a source data store storing data, the deletion notification comprising a set of deletion record IDs identifying a set of records for deletion and a TSN identifying a sequence of the deletion notification within a set of deletion notifications;
assigning a time-to-live (TTL) value to the deletion notification, wherein the deletion notification, including the TSN, is removed from the change feed at expiration of a time-period corresponding to the TTL value;
responsive to creating the deletion notification, incrementing a current DSN within the change feed, wherein the DSN persists in the change feed to identify a total number of deletion notifications generated on the change feed; and
responsive to receiving a query from a destination data store, providing a change update to the destination data store to delete the set of records associated with the deletion notification.

9. The method of claim 8, further comprising:
comparing, by a change feed reader, a local DSN value associated with a read-only version of the data on the destination data store with the current DSN obtained from the deletion notification in the change update received from the change feed to identify a difference between the local DSN value and a value of the current DSN.

10. The method of claim 9, further comprising:
deleting the set of records from the destination data store identified in the set of deletion records IDs in the deletion notification responsive to the difference between the local DSN value and the value of the current DSN being equal to one; and
incrementing the value of the local DSN value by one.

11. The method of claim 9, further comprising:
initiating a recovery operation responsive to the difference between the local DSN value and the value of the current DSN being equal to two or more.

12. The method of claim 8, further comprising:
comparing a previous TSN value associated with a read-only version of the data on the destination data store with the TSN obtained from the deletion notification received from the change feed in a change update to identify a difference between the previous TSN value and a value of a current TSN.

13. The method of claim 12, further comprising:
deleting a set of records from the destination data store identified in the set of deleted records IDs in the deletion notification responsive to the difference between a local DSN value and the value of the current DSN equal to one; and
incrementing the value of the local DSN value by one.

14. The method of claim 12, further comprising:
initiating a recovery operation responsive to the difference between the previous TSN value and the value of the current TSN equal to two or more.

15. One or more computer storage media having computer-executable instructions stored thereon for processing delete requests using sequence numbers with change feed, which, on execution by a computer, cause the computer to perform operations comprising:
creating a deletion notification in a change feed associated with a source data store storing data, the deletion notification comprising a set of deletion record IDs identifying a set of records to be deleted and a TSN identifying a sequence of the deletion notification within a set of deletion notifications;
assigning a time-to-live (TTL) value to the deletion notification, wherein the deletion notification, including the TSN, is removed from the change feed at expiration of a time-period corresponding to the TTL value;
responsive to creating the deletion notification, incrementing a current deletion notification sequence number (DSN) within the change feed, wherein the DSN persists in the change feed to identify a total number of deletion notifications generated on the change feed; and
responsive to receiving a query from a destination data store, providing a change update to the destination data store to delete the set of records associated with the deletion notification.

16. The one or more computer storage media of claim 15, wherein the operations further comprise:
comparing a local DSN value associated with a read-only version of the data on the destination data store with the current DSN obtained from the deletion notification in the change update received from the change feed to identify a difference between the local DSN value and a value of the current DSN.

17. The one or more computer storage media of claim 16, wherein the operations further comprise:
deleting the set of records from the destination data store identified in the set of deletion records IDs in the deletion notification responsive to the difference between the local DSN value and the value of the current DSN being equal to one; and
incrementing the value of the local DSN value by one.

18. The one or more computer storage media of claim 16, wherein the operations further comprise:
initiating a recovery operation responsive to the difference between the local DSN value and the value of the current DSN being equal to two or more.

19. The one or more computer storage media of claim 15, wherein the operations further comprise:
comparing a previous TSN value associated with a read-only version of the data on the destination data store with the TSN obtained from the deletion notification received from the change feed in a change update to identify a difference between the previous TSN value and a value of a current TSN.

20. The one or more computer storage media of claim 19, wherein the operations further comprise:
- deleting a set of records from the destination data store identified in the set of deleted records IDs in the deletion notification and incrementing a local DSN value by one responsive to the difference between the local DSN value and the value of the current DSN equal to one; and
- initiating a recovery operation responsive to the difference between the previous TSN value and the value of the current TSN equal to two or more.

\* \* \* \* \*